June 27, 1944. H. L. HALBACH ET AL 2,352,539
METHOD OF AND APPARATUS FOR DRAWING SHEET GLASS
Filed Dec. 1, 1939 5 Sheets-Sheet 1

Fig. 1.

INVENTORS
HOWARD L. HALBACH
GEORGE D. CAMPBELL
WALTER G. KOUPAL
Olen E. Bee
ATTORNEY June 27, 1944. H. L. HALBACH ET AL 2,352,539
METHOD OF AND APPARATUS FOR DRAWING SHEET GLASS
Filed Dec. 1, 1939 5 Sheets-Sheet 2

INVENTORS
HOWARD L. HALBACH
GEORGE D. CAMPBELL
WALTER G. KOUPAL
ATTORNEY

June 27, 1944.  H. L. HALBACH ET AL  2,352,539
METHOD OF AND APPARATUS FOR DRAWING SHEET GLASS
Filed Dec. 1, 1939  5 Sheets-Sheet 3

INVENTORS
HOWARD L. HALBACH
GEORGE D. CAMPBELL
WALTER G. KOUPAL
ATTORNEY

Patented June 27, 1944

2,352,539

UNITED STATES PATENT OFFICE 2,352,539

METHOD OF AND APPARATUS FOR DRAWING SHEET GLASS

Howard L. Halbach, Clarksburg, W. Va., George Donald Campbell, Tarentum, Pa., and Walter G. Koupal, Clarksburg, W. Va., assignors to Pittsburgh Plate Glass Company, a corporation of Pennsylvania Application December 1, 1939, Serial No. 307,086

15 Claims. (Cl. 49—17)

This invention relates to the manufacture of sheet glass and it has particular relation to methods of and apparatus for drawing sheet glass or window glass from a molten glass batch.

One object of the invention is to provide an improved method of and apparatus for drawing sheet glass which compares favorably in smoothness and uniformity of thickness to polished plate glass of the finest grade.

Another object of the invention is to provide an improved arrangement for introducing gaseous fluid into a drawing chamber of a glass melting tank.

Another object of the invention is to provide an improved glass drawing tank, in which gaseous fluid is so controlled as to insure the production of sheet glass free from ribs, streaks, or other distortion.

Another object of the invention is to provide a method of and apparatus for producing sheet glass in such manner that the temperatures of the glass surfaces and core are substantially equalized in the setting stages and as the glass approaches the initial annealing stages of the glass drawing operation.

Another object of the invention is to provide an improved method of drawing sheet glass in such manner as to insure smoother glass surfaces and uniform sheet thickness.

Another object of the invention is to provide an improved method of introducing gaseous fluid into the drawing chamber of an apparatus for drawing sheet glass and controlling the action of the gaseous fluid therein.

In the art of drawing sheet glass, or window glass, developments over a long period of years have been slowly progressing in the direction of the production of window glass which is free from ribs, wrinkles, streaks, uneven thickness, so-called "batter," the latter of which designates a surface condition resembling a hammered texture, etc. In fact, it has previously been the unattained goal in the art of drawing sheet glass to produce sheets simulating ground and polished plate glass in smoothness, degree and uniformity of thickness, etc.

Definite improvements have been achieved by the use of various designs of draw bars, water circulating coolers, by enclosing as much as practicable the drawing chamber, and by introducing air or other gaseous substances into the drawing chamber. Likewise, the expert refinement and coordination of these many features of development from time to time have resulted in a gradual improvement in the quality of the drawn glass produced. Prior to this invention, there has been a very definite distinction between ground and polished glass products, known as plate glass, and the drawn glass products, known generally as window glass. In view of the widely divergent methods of manufacture and differences in cost of production of these two types of sheet glass, the two products may be considered almost as being classified in two distinct industries.

According to the invention herein presented, a process and apparatus have been devised which produce drawn sheet glass or window glass of such refined quality as to be directly comparable to plate glass, and this new sheet glass has a uniformity of thickness and surface smoothness far in advance of any sheet glass heretofore produced by any known drawing process. In fact, there has been produced continuously by the improved drawing process sheet glass of various thicknesses, and the outstanding improvements were equally evident regardless of whether the glass sheets were drawn at minimum or maximum thickness. These operations have been successfully practiced in a full size glass drawing apparatus.

The new sheet glass tested by instruments to determine its smoothness and uniformity of thickness exhibited no appreciable flaws. The conventional streaks, ribs, and other distortion commonly found in ordinary drawn sheet glass were absent. Since the thickness of the improved sheet glass and its surface pattern are uniform, the cutting of the glass is greatly facilitated. Chipping along the cut edges is reduced to a minimum, and even and uniform severing or cracking along the cut edges is insured. On the other hand, commercial sheet glass produced by any other drawing method exhibits various imperfections when subjected to similar tests to determine its quality.

One type of glass melting tank of conventional design is provided with a drawing chamber through which the sheet glass is drawn by driven rolls from a molten bath upwardly through the roof of the drawing chamber into a vertical leer in which several pairs of drawing rolls are operated. This leer is partially enclosed and hot gases from the drawing chamber tend to rise and to be drawn upwardly by virtue of convection currents and draft action created in the leer and drawing chamber. The opening from the drawing chamber into the leer is in the form of a relatively narrow slot through which the sheet glass passes.

Proposals have been advanced to create currents of gaseous fluid, such as air, inside the drawing chamber by blowing fluid from a suitable source along the sheet glass surfaces for cooling or other purposes in an effort to produce uniformity of contact of the fluid with the glass sheet. In certain cases improved results in the pattern or surface of the glass have been accomplished, but they have been relatively slight and gradual in progressing from the older processes to those more advanced.

In one phase of the improved method and apparatus, gaseous fluid is introduced into the drawing chamber to dampen or approximately dissipate or choke off draft action and convection currents along the surfaces of the sheet glass, which is drawn from a molten glass bath. Particularly, the lower portion of the drawing chamber adjacent the plane of drawing is thus provided with a quiescent zone which insures uniform cooling of the sheet glass from its base or meniscus upwardly along the setting zone thereof. One arrangement for so introducing gaseous fluid includes conduits which are disposed on opposite sides of the sheet glass and are provided with openings for expelling fluid upwardly into the upper zone of the drawing chamber, while creating a quiescent zone in the lower portion thereof along the sheet glass. Other devices can be employed to shield the lower zone of the chamber adjacent the sheet glass from the action of drafts or convection currents, and several arrangements of structure with or without the use of fluid conduits are included in the concept of this invention.

Figure 1:
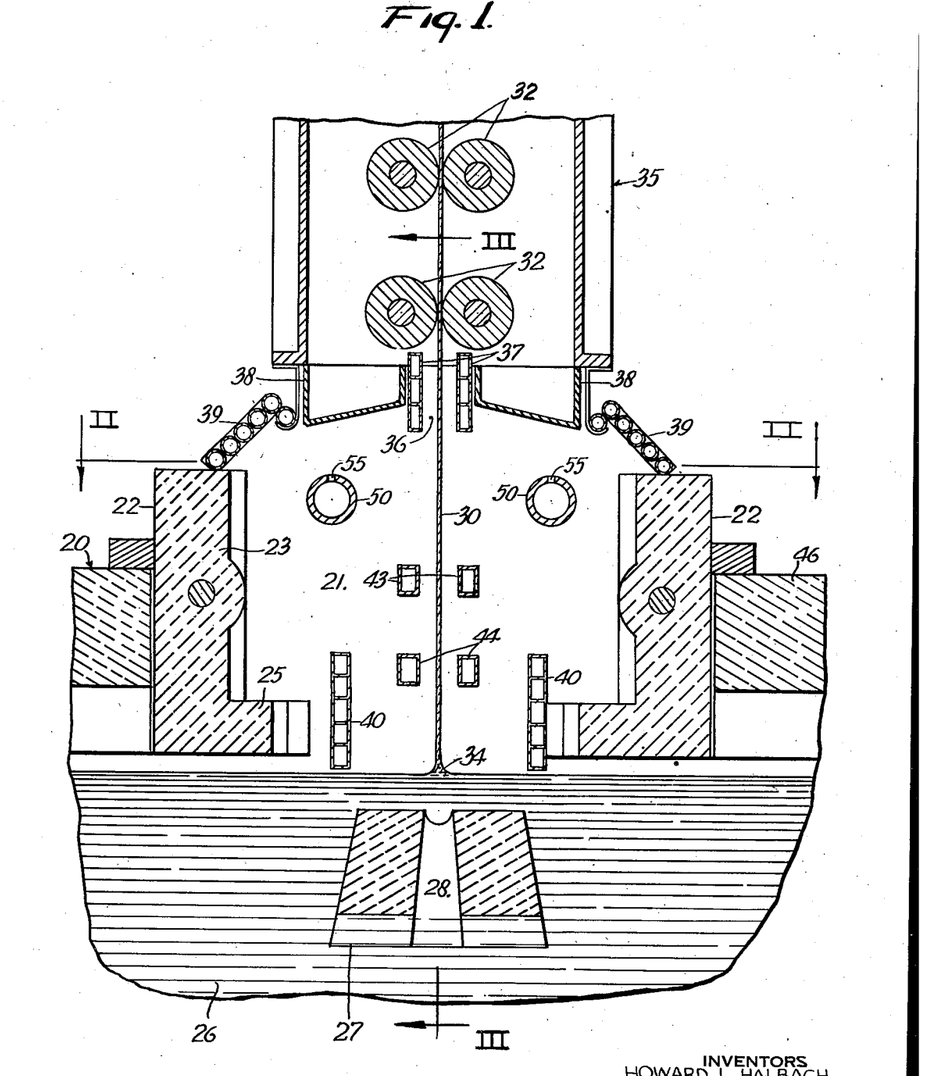
Figure 1 is a fragmentary vertical section of a sheet glass drawing apparatus including a drawing chamber and a vertical leer into which the glass is adapted to be drawn.
Figure 2:
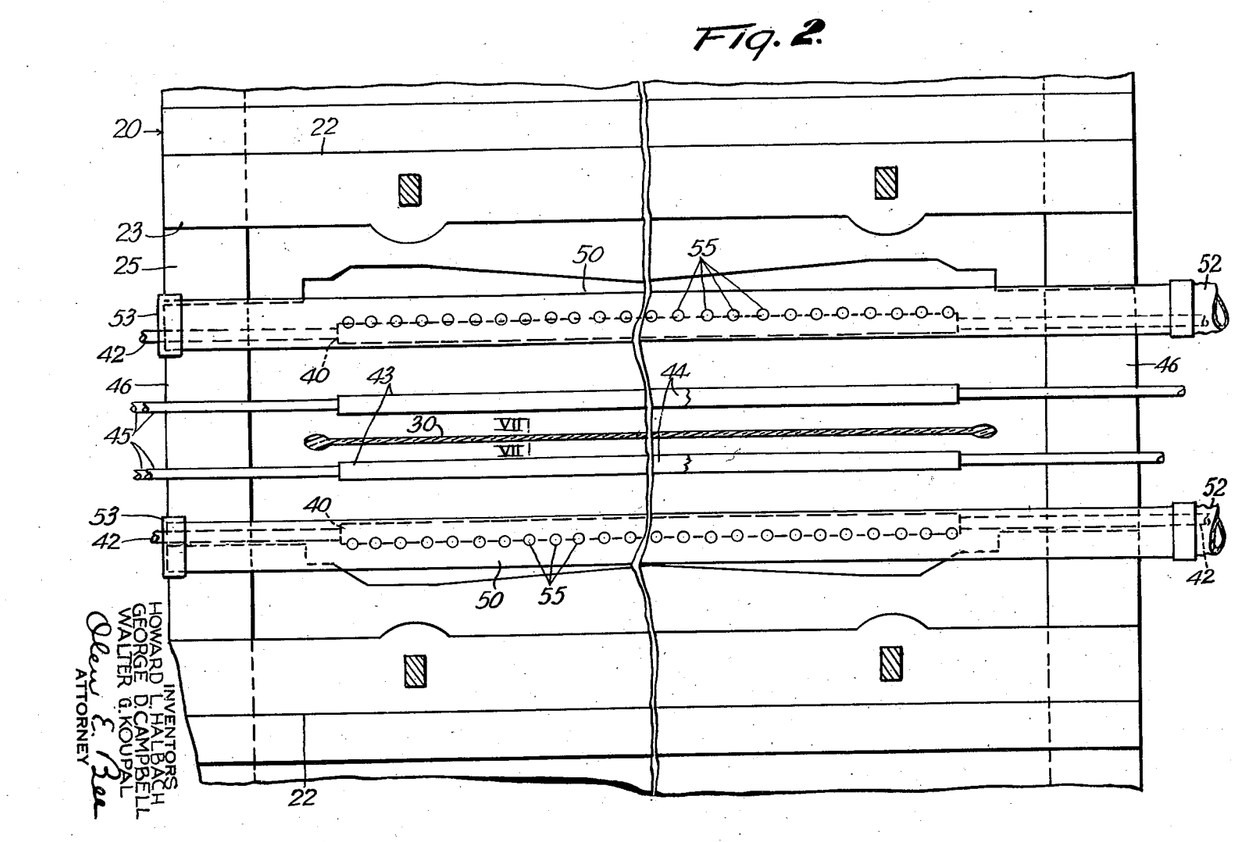
Fig. 2 is a fragmentary horizontal section taken substantially along the line II—II of Fig. 1.
Figure 3:
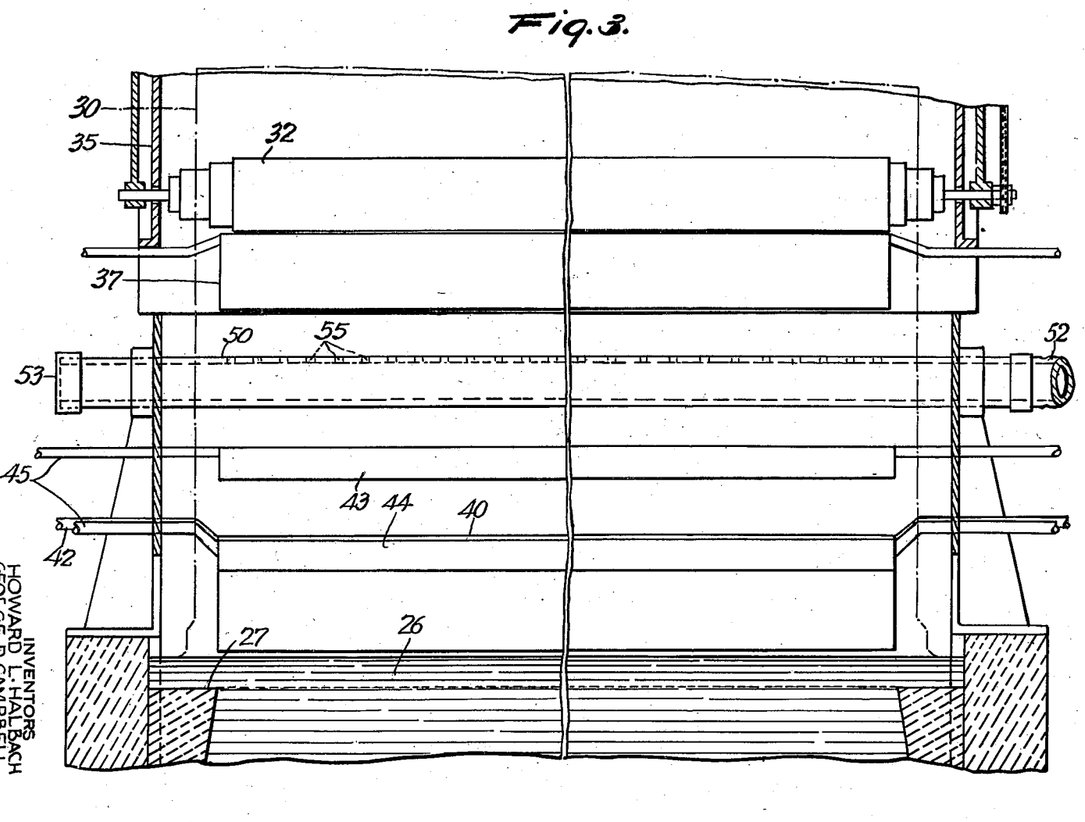
Fig. 3 is a vertical section taken substantially along the line III—III of Fig. 1.

In practicing the invention, a glass melting tank 20 is provided with the drawing chamber 21 partially defined by L-blocks 22 having vertical flange sections 23 and lower horizontal flange sections 25, the latter of which are arranged just above and substantially parallel to the surface of a molten glass bath 26 confined in the tank and flowing into the drawing chamber. The vertical plane of drawing in its beginning is determined by an oblong draw bar 27 horizontally disposed and having formed longitudinally therein a slot 28 which defines the plane of the molten glass as it is drawn upwardly into the form of sheet glass 30. Pairs of driven rolls 32 mounted in a leer 35 constructed above the drawing chamber to receive the sheet 30 between each pair thereof and provide power to maintain uniform upward movement of the sheet glass. The sheet glass from its base or meniscus 34 passes upwardly through a horizontal opening or slot 36 between cullet pan coolers 37, so called because they are located adjacent and between a pair of cullet pans 38 which form a portion of the roof of the drawing chamber and define the opening 36. The upper edge of each cullet pan cooler 37 is disposed closely adjacent the periphery of a lower driven roll 32 and this arrangement facilitates the control of air or gas as it moves upwardly from the upper opening in the drawing chamber.

Fluid-containing coolers 39 for circulating water, or the like, are mounted adjacent the outer sides of the cullet pans 38 between the latter and the upper portions of the vertical flange sections 23 of the L-blocks 22. These coolers 39 are conventional in construction and function, and constitute a portion of the enclosing wall structure of the drawing chamber.

So-called big coolers 40 are disposed transversely of the drawing chamber substantially parallel to the plane of drawing and are disposed in spaced relation to opposite sides thereof. Each big cooler 40 includes fluid supply conduits 42 for circulating therethrough water, or other fluid, and these big coolers, which are somewhat flat in contour, are arranged adjacent the inner extremities of the lower horizontal sections 25 of the L-blocks and extend upwardly in such position as to have their top edges disposed upwardly a considerable distance toward the central portion of the chamber 21. They present flat sides or walls in spaced relation on opposite sides of the lower portion of the sheet 30.

Other coolers designated as door coolers 43 and baby coolers 44 are arranged in spaced relation, one above the other, on each side of the sheet glass 30. These coolers are provided with fluid circulating conduits 45 and suitable fluid, such as water, is supplied thereto in a conventional manner for the purpose of insuring more favorable speed and cooling action in drawing the glass.

The structure just described, including the L-blocks 22, various coolers 37, 39, 40 and 44, cullet pans 38, leer 35, etc., are all supported in the walls 46 of the glass melting tank, or are carried upon suitable foundations (not shown) in connection with the conventional construction of the melting tank.

In connection with the glass drawing tank a suitable fluid control apparatus 41 (Fig. 5) is provided in which a blower 47 communicates with a heater and cooperates therewith to supply heated air or other gaseous fluid through conduits 49 at desired relative temperatures and pressures.

In the upper portion of the drawing chamber 21, a pair of substantially horizontal fluid discharging conduits 50 are carried in the tank walls 46 and are provided with flexible fluid conveying lines 52 secured thereto and to the outer ends of the supply conduits 49 of the heater 48. Each conduit 50, which is closed at one end, as indicated at 53, has a row of openings 55 along its upper wall portion facing upwardly and communicating through the conduits 50, 52 and 49 with the apparatus 41. Fluid under pressure and heated as desired by means of the apparatus 41 is thus available to be discharged through the conduit openings 55 into the upper zone of the drawing chamber 21. In order that the direction of discharge of the fluid from the openings 55 can be controlled with precision, each conduit 50 is rotatable about its longitudinal axis. The flexible character of the conduits 52 permits such action. Valves 51 are provided in the supply conduits 49 to regulate or equalize the flow of fluid to the conduits 50.

In one important phase of the invention, gaseous fluid, such as air, which has been found to be satisfactory, is introduced into the drawing chamber 21 in such manner that the stack or draft action ordinarily incidental to the passage of the gaseous fluid upwardly from the drawing chamber through the leer is satisfied or choked off to such extent that the stream of fluid separates, a portion of it passing upwardly from the upper zone of the chamber through the outlet 36 through which the sheet glass passes, and the other portion is directed downwardly along the sheet glass. The gaseous fluid may be said to be dammed up to provide on each side of the sheet glass a quiescent gaseous zone which may be termed a backwash, and the draft action is substantially dissipated by supplying more gaseous fluid than that ordinarily evolved into drafts that pass outwardly through the upper portion of the chamber 21. There is thus created what may be termed a mill-pond effect in the fluid backed up in the drawing chamber from the upper outlet 36.

In the upper portion of the chamber, a cushioning zone is thus provided from which the stack draft of the leer is supplied and against which the lower substantially quiescent gaseous fluid zone in the chamber 21 is banked. There is, however, turbulence created immediately above the conduits 50, but as the air or gaseous fluid is shunted toward the outlet 36, a portion of such fluid is banked or packed into a substantially quiescent state after being directed downwardly adjacent the glass sheet. During operation of the tank, tests have shown that a gas flame held upwardly in the outlet opening 36 responds definitely to draft action of considerable velocity. On the other hand, a gas flame held in the chamber 21 immediately below the opening 36 is not appreciably subjected to draft action, but it actually flattens or spreads out lazily in a depressed manner, or is actually directed downwardly a short distance. In other words, the stack or draft action created in the leer incidental to the passage of heated gaseous fluid upwardly therein is so balanced with respect to the amount of gaseous fluid injected into the chamber 21 through the conduit openings 55 that the chamber is maintained free from excessive pressure, while at the same time, draft or stack action, or any upward rush of heated gases from the surface of the molten bath 26 into the lower or upper zones on opposite sides of the sheet glass 30, is likewise prevented.

These upper and lower zones provide shielding curtains or films of air which protect the areas along opposite sides of the sheet glass 30 from whatever movement of air that occurs in the chamber and which might otherwise affect the surface pattern and the uniformity of cooling of the glass.

In connection with the existence of the substantially quiescent or balanced zone on which the downwardly shunted portion of the blown-in air balances the upward force of the hot gases in their natural impulse to rise from the bath surface, it should be noted that whatever gases which may be rising from the bath in excess of those required in the balanced zone, are deflected away from, and prevented from creating drafts or convection currents along or adjacent, the plane of drawing. Such rising currents of gases are deflected to locations outside the substantially quiescent zone by the latter and are thus prevented from disturbing the uniform setting of the glass sheet as described. Since these gases which would otherwise rush up the sides of the glass sheet are either balanced or deflected outwardly, they do not produce objectionable wiping action on the glass and do not create appreciable disturbance even in the locations outside the coolers or in the areas adjacent the inner sides of the L-blocks 22.

In previously known types of the glass drawing tank, currents of gaseous fluid created by the draft action or by convection, would rush upwardly from the base or meniscus of the drawn glass to wipe off the surfaces thereof and cool the latter rapidly. This wiping action of the air would create a condition wherein the surfaces or skins of the glass sheet would be cooled much faster than the interior or core thereof. Contraction would occur at the surfaces or skins of the glass from edge to edge thereof. Then later, when the glass would begin to set, warping or other distortion of the sheet would be inevitable. It is not believed that these factors, together with the causes and results thereof, have heretofore been fully recognized or considered in attempting to control the conditions obtaining along the surfaces of the glass sheet in connection with the critical phases of the forming and setting of the glass sheet.

In this improved arrangement, all of these disadvantages have been obviated and it has been found that exceptionally satisfactory results can be secured by positioning each row of openings 55 in such relation that the major portion of the gaseous fluid expelled therefrom is directed or shunted, by the aid of the bottoms of the cullet pans 38, toward the opening 36 to accentuate the damping or choking off of the draft action that tends to operate upwardly into the leer. It is not necessary to expel the fluid from the openings 55 at great velocity, or to heat this fluid excessively. The desired results have been achieved by heating the gaseous fluid fed through the conduits 50 to any temperature ranging from 100 degrees to 1000 degrees F. before forcing it through the conduits 50. It is not necessary to subject the fluid in the chamber to pressure greater than atmospheric pressure as a result of the blowing of fluid from the conduits 50. In fact, by observation it is noted that during successful operation of the apparatus, there occurs a drift of air somewhat lazily into the chamber 21 when small observation windows or doors are opened for purposes of facilitating inspection of the interior of the chamber. The paradoxical nature of this phenomenon is significant in view of the continual blowing of gaseous fluid into the chamber. However, the proofs are conclusively affirmative.

It is apparent that quiescent zones could be properly established and controlled at higher or lower pressures than those normally employed so long as the proper balance and control were maintained. Excellent results have been secured by establishing inside the supply conduits a fluid pressure approximately equal to that determined by 0.5 of an inch water column, i. e., approximately 0.29 ounce per square inch.

Likewise, excellent results have been achieved by heating the gaseous fluid, such as air, to a temperature of approximately 475 degrees F. before forcing it through the conduits 50. At approximately 10 inches above the molten glass bath in zones closely adjacent or on the sheet glass, the temperature of the surfaces of the glass sheet drawn in a conventional chamber, which was not provided with equivalents of the conduits 50, ranges from approximately 1250 to 1300 degrees F. A significant phenomenon occurs in connection with the improved operation of blowing fluid through the conduits 50, in that the blowing of the relatively cooler fluid at 475 degrees F. into the chamber 21, whose interior temperature is normally much higher than that of the blown-in fluid, actually produces a materially higher temperature along the surfaces of the glass sheet. This condition of temperatures occurs as a result of the action of the blown-in fluid creating the quiescent zones wherein the hot films of air along the glass surfaces are not wiped off by strong drafts or other air currents. In other words, these films can be termed dead air areas which constitute effective insulators and tend to adhere to the hot surfaces of the glass. Such dead air areas resist in appreciable degree the effect of the drifting or circulating of the gaseous fluid in the drawing chamber. In cooling the glass sheet by radiation or absorption of heat through the films of air, proper control and balance can be established and maintained by the degree of cooling provided in the big coolers 40, and other conventional cooling devices.

The big coolers 40 arranged adjacent the base of the sheet glass absorb heat radiated from the skin 56 and core 57 of the sheet glass, and the degree of cooling can be governed by the amount of cooling fluid employed, size of the coolers, etc. The skin 56 on opposite sides of the glass sheet 30 and the core 57 are diagrammatically illustrated in Fig. 7. Since each cooler 40, in effect, constitutes a vertical wall section extending upwardly from the inner extremity of the base section 25 of the L-block 22, the currents of gaseous fluid descending from the conduit 50 along the vertical section 23 and remote from the surface of the glass sheet are broken up. The coolers 40 and the chamber walls, including the walls of the glass sheet, thus cooperate with the fluid supplying conduits 50 in preventing the formation of drafts and convection currents. These elements also thus cooperate in establishing a quiescent zone or dead air area adjacent each side of the sheet glass base and upwardly along each surface of the glass to provide for the uniform cooling by radiation from both the skin and core of the glass.

Temperature differentials are thus substantially dissipated to insure uniform setting of the glass incidental or prior to the beginning of the annealing stage. This setting action occurs in the lower portion of the chamber 21 in a zone extending, with reference to the type of melting tank under consideration here, approximately six to fifteen inches upwardly from the surface of the molten glass bath on opposite sides of the sheet glass 30. This zone must be subject to critical control as to temperatures and the action of the volume of gaseous fluid therein.

In the form of tank in which the improved features of the invention have been included, the bottoms of the cullet pans 38 slope upwardly in converging relation and the air or gaseous fluid is expelled below these bottoms in substantially vertical directions. The slope of the cullet pan bottoms insures the shunting of a major portion of the fluid toward the opening 36. As the fluid stream reaches the opening 36, or upon approaching this opening, it becomes abated and the fluid separates into two streams, one of which flows upwardly toward the leer to satisfy the draft action and the other flowing slowly downwardly toward the sheet glass in the upper portion of the chamber for a short distance until it becomes banked and substantially quiescent and drifts so slowly as not to disturb the film of air, or dead air areas, on the surfaces of the drawn sheet of glass. If the bottoms of the cullet pans were horizontal, the openings 55 would then be directed at an angle to the vertical and more toward the opening 36 to cause the blowing of a major portion of the fluid toward this opening.

Figure 4:
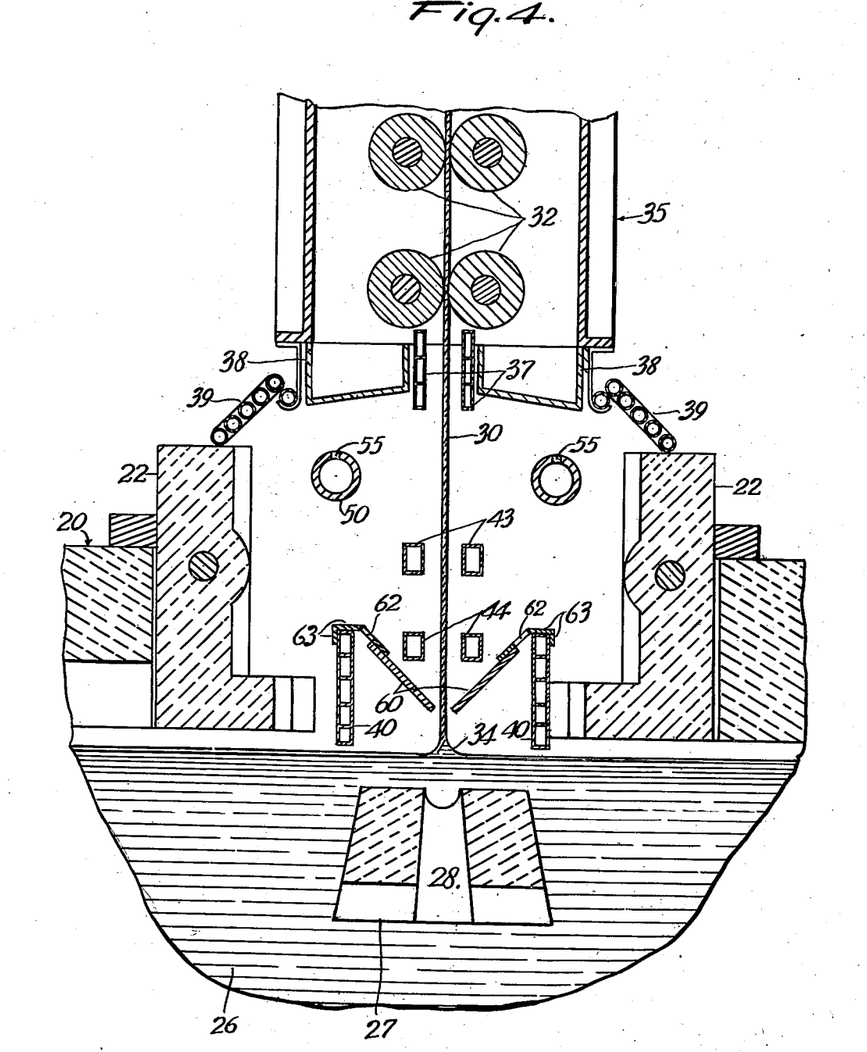
Fig. 4 is a vertical section similar to Fig. 1, in which additional elements are included for improving the surface pattern of the glass.

Referring to Fig. 4, a plate baffle 60 is positioned in the chamber so as to extend upwardly and away from the sheet glass from a position adjacent the meniscus to the upper edge of the big cooler 40. This baffle or shield is disposed at an angle of substantially 45 degrees and its upper portion adjacent the big cooler is vented, as indicated at 62, to provide for the passage of gases therethrough. Suitable flanges 63 connected to the big coolers 40 provide for mounting of the plate baffles in proper position thereon. The gaseous fluid currents tending to form in the drawing chamber and naturally tending to rise, are broken up by this shield and prevented from exercising a wiping action against the surface of the glass. This arrangement of shields thus creates a quiescent zone adjacent the molten bath surface on each side of the glass sheet while the latter is still in a plastic state, and prevents the wiping off of the films of dead air areas of air on opposite glass surfaces.

Figures 5, 6, 7:
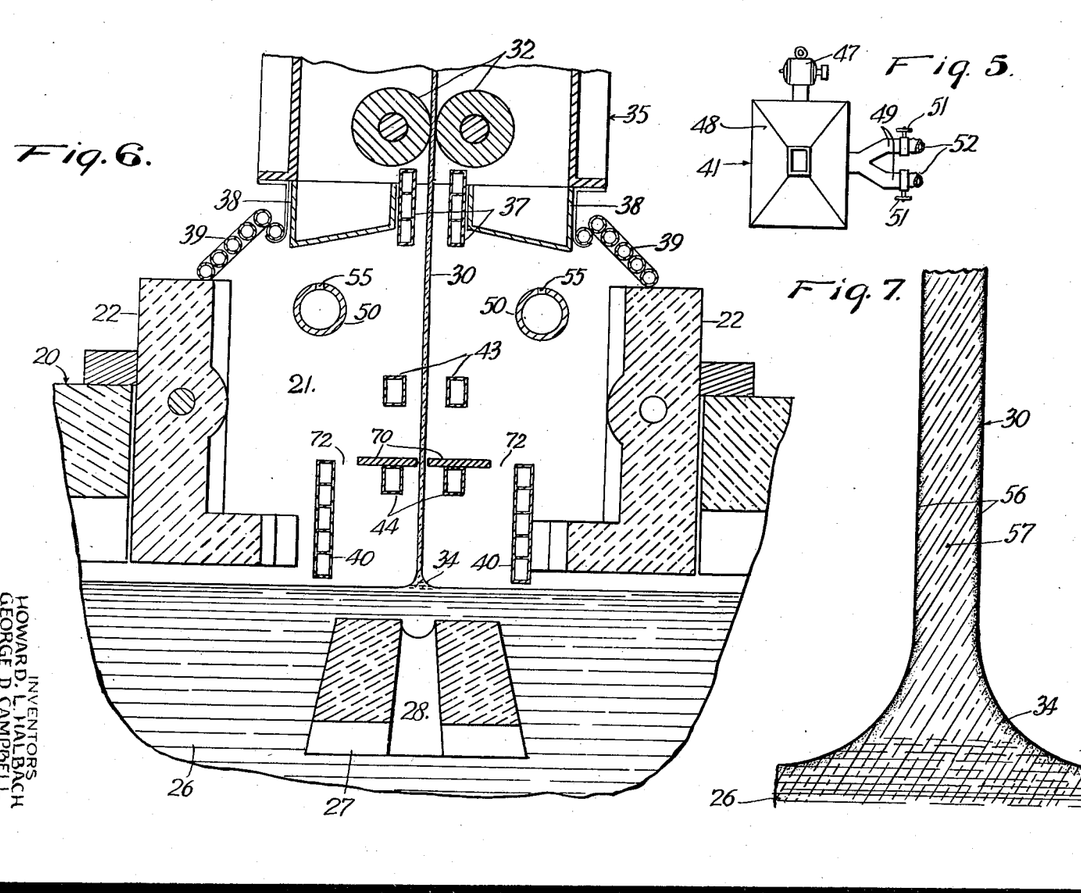
Fig. 5 is a diagrammatic plan, on a smaller scale, of a blower and heater for controlling pressure and temperature of air or other gaseous fluid to be supplied to the drawing chamber.
Fig. 6 is a vertical section similar to Fig. 1 and including another arrangement of apparatus for controlling the pattern of drawn glass.
Fig. 7 is a fragmentary vertical section on a larger scale taken substantially along the line VII—VII of Fig. 2.

In another form of construction of the drawing chamber, as shown in Fig. 6, a horizontal shield 70 is mounted immediately above or in contact with, the baby cooler 44 on each side of the sheet glass, and the inner edge of each shield is disposed immediately adjacent the glass. This shield prevents upward drafts or breaks them up to such extent as to insure a substantially quiescent zone in the lower portion of the drawing chamber along the glass sheet, and provides for uniform cooling and setting of the glass prior to the beginning of the annealing stage. It should be noted that ample space, as indicated at 72, is provided between the outer edges of the plates 70 and the coolers 40 to permit circulation of the gaseous fluid as it lazily drifts about in the chamber 21. On the other hand, the inner edges of the plates 70 are disposed as closely adjacent the glass sheet as possible without touching the latter in order to prevent upward drafts or convection currents and to protect the hot air film or dead air area along the glass surfaces from being dissipated.

The conduits 50 are included in this construction to cooperate with the plates 70 in creating proper conditions of stable atmosphere and uniformity of radiation of heat from the body of the sheet glass. However, it is to be understood that the tank can be operated with or without the supply of fluid being expelled into the chamber through the rows of openings in these conduits 50.

From the foregoing description it will be apparent that the methods and apparatus involved in the application of the invention provide for the production of exceptionally advanced quality of sheet glass without greatly modifying known types of apparatus now in commercial use, and hence, the value of the improvements are proportionately much greater than the costs of additional structure involved in the practice of the invention.

Although several arrangements involved in the practice of the invention have been shown and described in detail, it will be apparent to those skilled in the art that the invention is not so limited, but that various changes can be made therein without departing from the spirit of the invention or from the scope of the appended claims.

We claim:

1. In the production of sheet glass in a drawing chamber in which drawn glass is adapted to become set in a setting area, the method which comprises drawing a sheet of glass upwardly from a molten glass bath through the chamber, and introducing a gaseous medium into said chamber in such position and at such pressure as to counteract substantially to the point of equalization the upward movement of gases resulting from natural draft and convection currents adjacent the sheet of glass until the latter becomes set.

2. In the production of sheet glass in a drawing chamber in which draft and convection currents inherently tend to form and move along the surfaces of drawn sheet glass at the setting area thereof, the method which comprises drawing a sheet of glass upwardly from a molten glass bath through the chamber, and counterbalancing the tendency of said draft and convection currents to move upwardly by the introduction of a gaseous medium into the chamber and thus creating a substantially quiescent chamber atmosphere along the drawn glass sheet until the latter becomes set.

3. In the production of sheet glass in a drawing chamber in which draft and convection currents inherently tend to form and move upwardly along the surfaces of drawn sheet glass at the setting area thereof, the method which comprises drawing a sheet of glass substantially vertically from a molten glass bath through the chamber, introducing a gaseous medium into the chamber in counteracting relation to the movement of the draft and convection currents that tend to form and move at the glass setting area and thus creating a substantially quiescent chamber atmosphere along the drawn sheet of glass, and cooling the sheet of glass in the substantially quiescent chamber atmosphere until said glass becomes set.

4. In the production of sheet glass, the method which comprises drawing a sheet of glass upwardly from a molten glass bath through a substantially closed drawing chamber in which gases tend to rise from the bath and flow along the sides of the sheet of glass, and maintaining in said chamber in opposition to the tendency of the gases to rise a substantially quiescent zone of heated gaseous medium through which zone the sheet of glass is drawn, the pressure of the gaseous medium in said quiescent zone being sufficiently great to deflect away from the glass sheet the gases which tend to rise from the bath adjacent the sides of said sheet.

5. In the production of sheet glass, the method which comprises drawing a sheet of glass upwardly from the surface of a molten glass bath through a substantially closed chamber, and introducing a gaseous medium into the chamber at a position adjacent the top of the chamber in a substantially upward direction and under a pressure sufficient only to substantially overcome the tendency of the gases in the space adjacent the sheet between the meniscus and said position to form draft and convection currents whereby a quiescent zone is maintained in said space.

6. In the production of sheet glass in a drawing chamber, the method which comprises drawing a glass sheet upwardly from a molten glass bath, introducing a gaseous medium into the upper extremity of the chamber in such position as to form a gaseous cushion zone in the upper portion of the chamber adjacent the glass sheet and thereby counteracting the upward movement of the chamber atmosphere tending to rise from the bath to form a substantially quiescent chamber atmosphere, and subjecting said glass sheet to the substantially quiescent chamber atmosphere thus created from the base thereof upward therealong for a substantial distance and until the glass sheet becomes set.

7. In a method of drawing sheet glass from a molten glass bath in which the sheet glass is adapted to set and pass upwardly through a slotted bottom of a leer, the steps which comprise discharging a gaseous medium in stream form upwardly in the upper portion of the chamber toward the slotted bottom of the leer, dividing the discharged gaseous medium into a stream portion directed upwardly in sufficient quantity to satisfy draft action of the leer and into another stream portion in sufficient quantity to be shunted from the slotted bottom of the leer downwardly, and counteracting with the downwardly directed portion of the stream the movement of chamber atmosphere tending to rise from the surface of the bath to create a substantially quiescent chamber atmosphere along the sheet glass surface, and cooling the glass until it becomes set in the drawing chamber.

8. In a method of drawing sheet glass from a molten glass bath in which the sheet glass is adapted to set and pass upwardly through a slotted bottom of a leer, the steps which comprise directing a flow of gaseous medium upwardly in the upper portion of the chamber toward the slotted bottom of the leer, dividing the flow of gaseous medium into a stream portion directed upwardly in sufficient quantity to satisfy draft action of the leer and into another stream portion in sufficient quantity to be shunted from the slotted bottom of the leer downwardly, and counteracting with the downwardly directed portion of the gaseous medium the movement of chamber atmosphere tending to rise from the surface of the bath to create a substantially quiescent chamber atmosphere along the sheet glass surface, and cooling the glass until it becomes set in the drawing chamber.

9. In a glass drawing apparatus, a drawing chamber having an upwardly opening glass-receiving passage therein and having mechanism for drawing a glass sheet upwardly in the chamber through said passage along a predetermined plane of drawing, said chamber having a molten glass bath therein from which the glass sheet is drawn and from which draft and convection currents naturally tend to flow upwardly along the plane of drawing, said chamber having a volume of gaseous medium flowing in the upper portion thereof adjacent said passage and directed in counteracting relation to the upward flow of draft and convection currents from the molten bath to create a quiescent chamber atmosphere along the sides of the plane of drawing, and means for controlling the flow of said gaseous medium.

10. In a glass drawing apparatus, a drawing chamber having mechanism for drawing sheet glass upwardly and defining a plane along which the sheet glass is drawn from a molten glass bath, said chamber having a roof section and defining an opening through which the glass is upwardly drawn, conduits disposed on opposite sides of the plane of drawing of the sheet glass in the upper portion of the chamber and having discharge openings facing upwardly and normally discharging gaseous fluid against the roof section of the chamber at such angles that the greater volume of gaseous fluid is directed toward the upper chamber opening through which the sheet glass is drawn, and means for supplying gaseous fluid under pressure to the conduits.

11. In a glass drawing apparatus, a drawing chamber having mechanism for drawing sheet glass upwardly and defining a plane along which the sheet glass is drawn from a molten glass bath, said chamber having an upper opening through which the glass is adapted to pass, substantially parallel conduits disposed horizontally on opposite sides of the plane of drawing of the sheet glass and having perforations opening upwardly in the upper chamber region for discharging gaseous fluid upwardly in the upper area of the drawing chamber in sufficient quantity to substantially choke off draft action in the upper extremity of the drawing chamber, and means for supplying gaseous fluid under pressure to the conduits.

12. In a glass drawing apparatus, a drawing chamber having mechanism for drawing sheet glass upwardly from a molten glass bath therein and defining a vertical plane of drawing, said chamber including walls spaced from said plane of drawing on opposite sides thereof, conduits disposed on opposite sides of the plane of drawing and having openings directed upwardly for discharging fluid upwardly into the upper portion of the drawing chamber, and partition members below the conduits extending from opposite sides of the plane of drawing and dividing said chamber into upper and lower compartments to arrest the circulation of chamber atmosphere between said compartments adjacent the plane of drawing, outer edges of said partition members being spaced from the walls of the chamber to permit free circulation of the chamber atmosphere between said compartments at locations remote from said plane of drawing, and means for supporting the partition members in said chamber.

13. In a method of drawing a smooth and uniform sheet of glass from a bath of molten glass in a drawing chamber having a vertical leer thereabove and in which natural draft and convection currents inherently tend to rise and pass up the sheet of glass in the setting zone; the steps which comprise drawing said sheet of glass vertically upward from the bath into the leer, establishing and maintaining a flow of a gaseous medium from an extraneous source downwardly along the sheet in a zone above the sheet setting zone and in opposition to upward urge of draft and convection currents tending to rise therein, and controlling such flow to counteract said draft and convection currents to the point of substantially establishing quiescence adjacent the sheet in the setting zone.

14. A method of securing substantially complete quiescence in the atmosphere of the setting zone of a sheet of glass being drawn from a molten glass bath in a drawing furnace, which method comprises flowing a gaseous medium downwardly along the sheet in a zone above the setting zone in opposition to, and to the extent of substantially counterbalancing, the upward flow of draft and convection currents adjacent said sheet.

15. A method of maintaining substantially complete quiescene in the atmosphere in the setting zone of a drawing chamber of a vertical-draw furnace for drawing sheet glass from a bath of molten glass, which furnace has a vertical leer creating a natural draft upwardly through the furnace, said method comprising introducing a gaseous medium into the drawing chamber in a zone below the lower extremity of the leer and above the setting zone, the flow of gaseous medium being divided, a part thereof being directed upwardly along the sheet being drawn and a part being directed downwardly along the sheet, the flow of the two parts acting in one part to satisfy the natural draft in the leer and acting in the other part to counterbalance to the point of substantially neutralizing the draft and convection currents tending to move upwardly along the sheet through the setting zone.

HOWARD L. HALBACH.
GEORGE DONALD CAMPBELL.
WALTER G. KOUPAL.